United States Patent

Beard et al.

[11] Patent Number: 5,841,281
[45] Date of Patent: Nov. 24, 1998

[54] METHOD FOR DETERMINING ELECTRICAL CONDUCTIVITY OF EARTH FORMATIONS FROM ELECTROMAGNETIC INDUCTION VOLTAGE MEASUREMENTS

[75] Inventors: David R. Beard; Carlos A. Yanzig; Leonty A. Tabarovsky, all of Houston, Tex.

[73] Assignee: Western Atlas International, Inc., Houston, Tex.

[21] Appl. No.: 620,613

[22] Filed: Mar. 22, 1996

[51] Int. Cl.[6] .............................. G01V 3/28; G01V 3/10; G01V 3/15
[52] U.S. Cl. ........................................... 324/339; 324/338
[58] Field of Search .................................... 324/338, 339, 324/340, 341, 342, 343; 364/422

[56] References Cited

U.S. PATENT DOCUMENTS 4,739,272  4/1988  Griffin et al. ............................ 324/339

OTHER PUBLICATIONS

Kunz et al., "Basic Theory of Induction Logging" and Geophysics, vol. XXVII No. 6 Part 1 Dec. 1962 pp. 829–858.

Primary Examiner—Walter E. Snow
Attorney, Agent, or Firm—Richard A. Fagin

[57] ABSTRACT

A method of determining the conductivity of earth formations penetrated by a wellbore. The method includes inserting an induction well logging instrument into the wellbore. The instrument includes a transmitter, a source of alternating current connected to the transmitter, and a receiver. The transmitter is energized with the alternating current, voltages induced in the receiver are recorded, and area enclosed with respect to a baseline, by voltage peaks present in the recorded voltages is determined. The enclosed area corresponds to the conductivity.

6 Claims, 3 Drawing Sheets

METHOD FOR DETERMINING ELECTRICAL CONDUCTIVITY OF EARTH FORMATIONS FROM ELECTROMAGNETIC INDUCTION VOLTAGE MEASUREMENTS

BACKGROUND OF THE INVENTION

1. Field of the Invention

The present invention is related to the field of electromagnetic induction well logging instruments. More specifically, the present invention is related to methods of signal processing for electromagnetic induction well logging instruments for determining integrity of the measurements and petrophysical properties of earth formations.

2. Description of the Related Art

Formation resistivity well logs are commonly used to map subsurface geologic structures and to infer the fluid content within pore spaces of earth formations. Formation resistivity well logs include electromagnetic induction logs. Electromagnetic induction logs typically are measured by an instrument which includes a transmitter, through which a source of alternating current (AC) is conducted, and includes receivers positioned at spaced apart locations from the transmitter. The AC passing through the transmitter induces alternating electromagnetic fields in the earth formations surrounding the instrument. The alternating electromagnetic fields induce eddy currents within the earth formations. The eddy currents tend to flow in "ground loops", which are most commonly coaxial with the instrument. The magnitude of the eddy currents can be related to the electrical conductivity (the inverse of the resistivity) of the earth formations. The eddy currents, in turn, induce voltages in the receivers which, generally speaking, are proportional to the magnitude of the eddy currents. Various circuits are provided in the instrument to measure the magnitude of the induced voltages, and thus determine the conductivity (and therefore the resistivity) of the earth formations.

Most electromagnetic induction well logging instruments determine the resistivity of the earth formations by various forms of processing voltages induced in the receivers in the frequency domain. For example, some induction logging instruments include circuits (usually referred to as phase sensitive detectors) for measuring the magnitude of a component of the voltages induced in the receivers which is coincident with a predetermined time reference, such as the phase of the AC flowing in the transmitter. See, for example, *Basic Theory of Induction Logging and Application to Study of Two-Coil Sondes,* J. H. Moran and K. S. Kunz, Geophysics, vol. 27, no. 6, Society of Exploration Geophysicists, 1962. Other phase sensitive detectors for measuring a magnitude of a quadrature component of the induced voltage can also be provided in some induction logging instruments.

Phase-referenced measuring circuits were originally provided in analog form as described, for example, in U.S. Pat. No. 4,499,421 issued to Sinclair. The apparatus in Sinclair '421 includes analog-to digital conversion of the output of phase-referenced measuring circuits. The apparatus described in the Sinclair '421 patent, however, performs digitization only after the induced voltages have been measured by an analog phase sensitive detector.

An apparatus described in U.S. Pat. No. 5,157,605 issued to Chandler et al includes digitization of the voltage induced in the receivers before the signals are processed in a digital phase sensitive detector. The output of the digital phase sensitive detectors in the apparatus in the Chandler et al '605 patent, however, still only represents the magnitudes of certain phase-referenced components of the receiver signals, just as with induction logging instruments having analog phase sensitive detectors. Whether phase sensitive detection is performed in either analog or digital form, the receiver signals of these prior art induction logging instruments are effectively analyzed in the frequency domain. Typically, time domain representations of the receiver signals are not recorded or transmitted.

Another method of induction logging signal processing is described in U. S. Pat. No. 4,849,699 issued to Gill et al. The apparatus described in the Gill et al '699 patent includes a circuit for conducting short duration, high-power pulses of electrical energy through the transmitter. Voltages are induced in receivers as a result of the electromagnetic fields generated by the transmitter. The induced voltages are then digitized. After digitization, the induced-voltage receiver signals of the instrument described in the Gill et al '699 patent are processed by application of a Fourier transform. The interpretation of the receiver signals is therefore performed in the frequency domain. Additionally, the pulses applied to the transmitter in the apparatus described in the Gill et al '699 patent comprises a complex voltage waveform. Interpretation of the signals induced in the receivers in this instrument would be difficult if not performed in the frequency domain.

The prior art methods of processing receiver signals in the frequency domain do not account for some valuable information relative to the proper operation of induction instruments. The process of signal conversion to the frequency domain, or extraction of frequency domain attributes of the receiver signals, may obscure information which is particularly suitable to analysis by processing the receiver signals in the time domain.

Accordingly, it is an object of the present invention to provide a method of analyzing receiver signals from an induction logging instrument in the time domain to better ascertain operating conditions of the instrument.

It is another object of the present invention to provide a method of determining conductivity of the earth formations by analyzing receiver signals from the induction logging instrument in the time domain.

SUMMARY OF THE INVENTION

The invention is a method of determining the conductivity of earth formations penetrated by a wellbore. The method includes inserting an induction well logging instrument into the wellbore. The instrument includes a transmitter, a source of alternating current connected to the transmitter, and a receiver. The transmitter is energized with the alternating current, voltages induced in the receiver are recorded, and area enclosed with respect to a baseline, by voltage peaks present in the recorded voltages is determined. The enclosed area corresponds to the conductivity.

The invention is also a method of determining unbalanced receiver conditions in an induction logging instrument. The transmitter is energized by the source, voltages induced in the receiver are recorded, and changes in magnitude are determined of a voltage component of the source present in the detected voltages. The changes in magnitude of the source component of the voltage corresponds to the unbalanced receiver condition. The unbalanced receiver condition can correspond to axial movement of the receiver or to presence of magnetic material proximal to the receiver.

DESCRIPTION OF THE PREFERRED EMBODIMENT

1. Apparatus of the Invention

Figure 1:
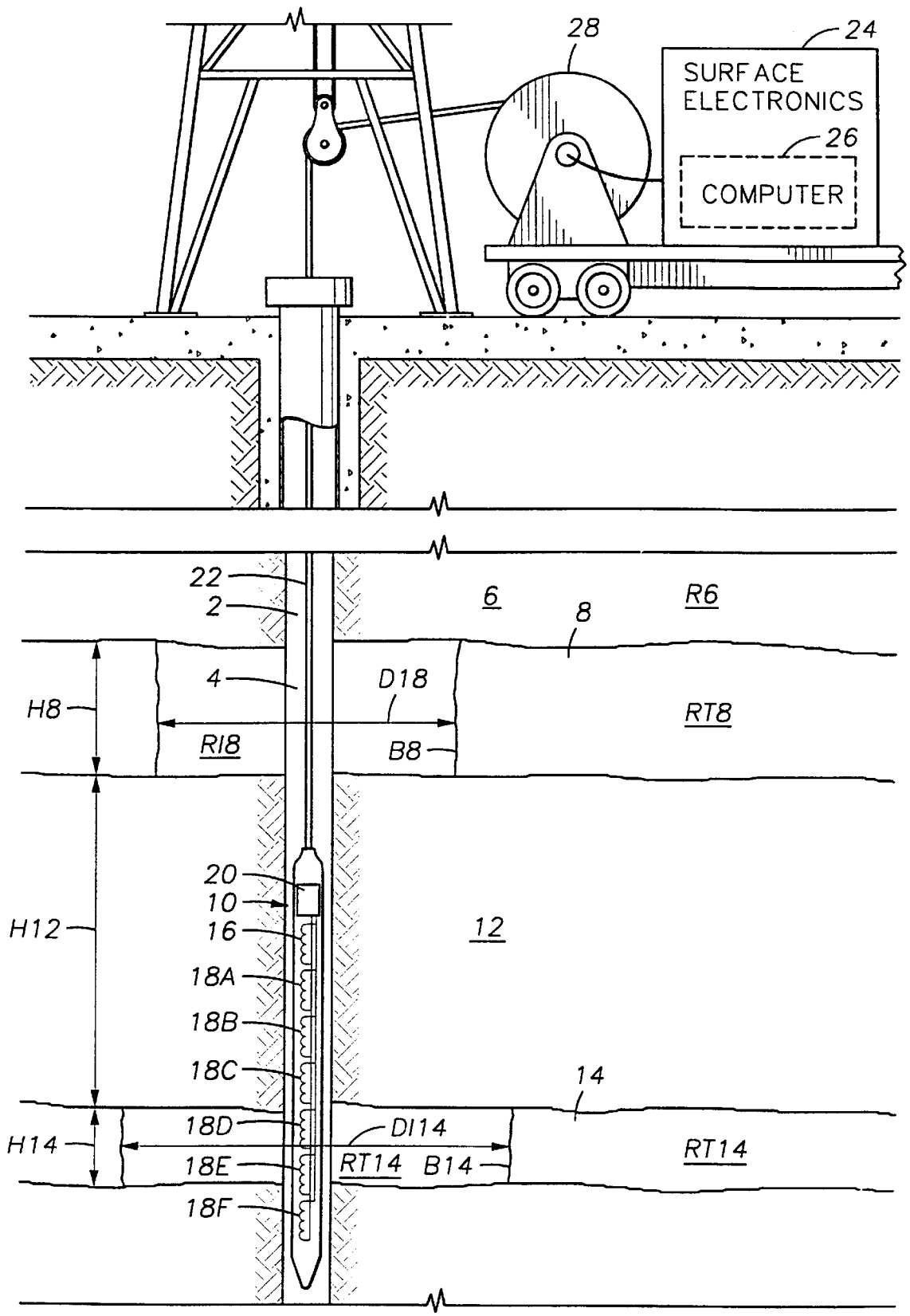
FIG. 1 shows an induction well logging instrument disposed in a wellbore.

FIG. 1 shows an induction well logging instrument 10 disposed in a wellbore 2 drilled through earth formations. The earth formations are shown generally at 6, 8, 12 and 14. The instrument 10 is typically lowered into the wellbore 2 at one end of an armored electrical cable 22, by means of a winch 28 or similar device known in the art. An induction well logging instrument which will generate appropriate signals for performing the process of the present invention is described, for example, in U.S. Pat. No. 5,452,761 issued to Beard et al. The instrument described in the Beard et al '761 patent is meant only to serve as an example of, and is not meant to be an exclusive representation of induction well logging instruments which can generate signals usable for performing the process of the present invention and is therefore not to be construed as a limitation on the present invention. The instrument described in the Beard et al '761 patent, however, has certain advantages for use in performing the method of the present invention which will be further explained.

The instrument 10 can include a telemetry/signal processing unit 20 (SPU). The SPU 20 can include a source of alternating current (not shown separately). The alternating current is generally conducted through a transmitter 16 disposed on the instrument 10. Receivers 18A–18F can be disposed at axially spaced apart locations along the instrument 10. The SPU 20 can include receiver circuits (not shown separately) connected to the receivers 18A–18F for detecting voltages induced in each one of the receivers 18A–18F. The SPU 20 can also impart signals to the cable 22 corresponding to the magnitude of the voltages induced in each of the receivers 18A–18F. It is to be understood that the number of transmitters and receivers, and the relative geometry of the transmitter and receivers shown in the instrument 10 in FIG. 1 is not meant to be a limitation on the present invention. It is also to be understood that each receiver 18A–18F can comprise either a single wire coil, or can comprise multiple coils electrically interconnected to reduce the effect of direct electromagnetic coupling from the transmitter 16 (this latter type of coil being referred to as mutually balanced).

As is understood by those skilled in the art, the alternating current passing through the transmitter 16 induces eddy currents in the earth formations 6, 8, 12, 14. The eddy currents correspond in magnitude both to the electrical conductivity of the earth formations 6, 8, 12, 14 and to the relative position of the particular earth formation with respect to the transmitter 16. The eddy currents in turn induce voltages in the receivers 18A–18F, the magnitude of which depends on both the eddy current magnitude and the relative position of the earth formation with respect to each individual receiver 18A–18F.

The voltages induced in each receiver 18A–18F correspond to apparent electrical conductivity of all of the media surrounding the instrument 10. The media include the earth formations 6, 8, 12 and 14 and the drilling mud 4 in the wellbore 2. The degree of correspondence between the voltages induced in a particular receiver (for example 18C), and the electrical conductivity of the particular earth formation axially disposed between the particular receiver 18C and the transmitter 16, can depend on the vertical thickness of the particular earth formation, such as shown at H8 for earth formation 8. A more closely spaced receiver such as 18A would have more of its voltage induced by eddy currents flowing from entirely within a thinner formation such as 14 (having a thickness shown at H14), than would be the case for a longer spaced receiver such as 18F. Conversely, the eddy currents which induce the voltages in receiver 18A would more likely correspond to the conductivity within a zone such as shown at RI14, which is affected by fluid "invasion" into its pore spaces from the liquid phase of a fluid 4 used to drill the wellbore (commonly known as "drilling mud", the liquid phase known as "mud filtrate"). The radial distance from the center of the wellbore 2 to which the mud filtrate penetrates the particular earth formation can be different for each formation. A more deeply invaded zone DI14 in formation 14 is shown in comparison to a more shallow invaded zone DI8 in formation 8. Other formations, such as 6 and 12, may be substantially impermeable to fluid flow and therefore may not have invaded zones at all. The radial depth of invasion, such as DI8 or DI14, is typically not known at the time the instrument 10 is moved through the wellbore 2.

The signals corresponding to the voltages in each receiver 18A–18F (generated by the SPU 20) can be transmitted along the cable 22 to surface electronics 24. The surface electronics 24 can include detectors (not shown) for decoding the signals transmitted from the instrument 10, and a computer 26 to perform the process according to the present invention on the signals transmitted thereto.

One particular advantage of using the instrument described in the Beard et al '761 patent as it relates to the present invention is the use therein of a synchronous stacking circuit. The synchronous stacking circuit provides a digital representation of the signals induced in each receiver 18A–18F which includes a small enough number of digital signal samples so as to enable successful transmission of the digital representations of the entire receiver signal waveform to the earth's surface over the cable 22. The synchronous stacker circuit described in the Beard et al '761 patent facilitates the process of the present invention but is not meant as an exclusive representation of circuits which will provide receiver signals usable in the method of the present invention. The aspect of the receiver signals which is necessary to perform the method of the present invention is that substantially the entire receiver signal waveform must be accessible in the time domain. If the receiver signals are transmitted or stored in digital form, there must be enough digital samples of the receiver signals to adequately represent the entire waveform of the receiver signals.

Another aspect of the apparatus described in the Beard at al '761 patent which is advantageous in practicing the present invention is that the voltage applied to the transmitter 16 can be in the form of square waves. The purpose for driving the transmitter 16 with square wave voltage will be further explained.

2. Determining Conductivity of the Formation

Figure 2:
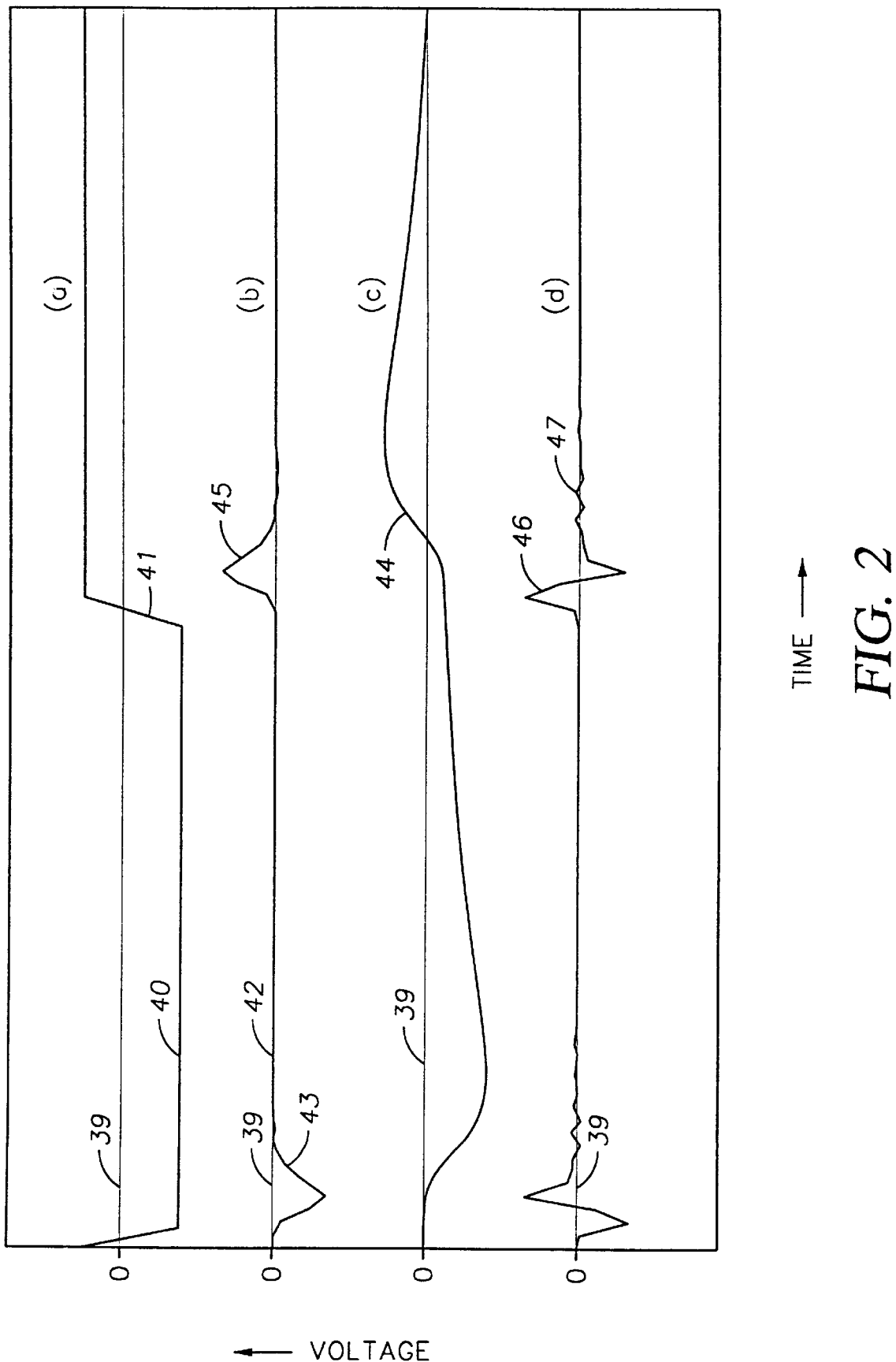
FIG. 2 shows voltage waveforms under various conditions for one of the receivers in the instrument of FIG. 1.

Graphic representations of the voltage applied to the transmitter (16 in FIG. 1), and the voltages induced in the receivers (18A–18F in FIG. 1) can be observed by referring to the graphs in FIG. 2. Curve 40 represents the magnitude, with respect to time, of the voltage applied to the transmitter (16 in FIG. 1). Curve 42 represents the magnitude, with respect to time, of voltages induced in one of the receivers (such as 18C in FIG. 1). As previously explained, the voltage applied to the transmitter comprises square waves. The voltage applied to the transmitter 16 therefore undergoes relatively sharp amplitude breaks, such as shown at 41, from one polarity to the other. Voltages can then be induced in the receiver 18C which correspond to the conductivity of the formation. When square wave voltage is applied to the transmitter 16, the resulting voltages induced in the receiver can be observed as somewhat rounded "peaks", as shown at 43 and 45, each of which corresponds to one of the changes in polarity of the transmitter voltage (such as shown at 41). The overall shape of the curve 42 is similar for each receiver (18A–18F in FIG. 1). The effect of the conductivity of the media surrounding the instrument (10 in FIG. 1) is to delay in time and to attenuate the peak amplitude of the signals (such as shown at curve 42) induced in the receiver 18C.

It has been determined that the peaks 43, 45 enclose an area with respect to the zero baseline 39 corresponding directly to the conductivity of the media surrounding the instrument (such as the earth formations 8, 12, 14 in FIG. 1). Further, at conductivities below about 1000 mS/m, the relationship of the enclosed area of the peaks 43, 45 with respect to the formation conductivity is relatively unaffected by the so-called "skin effect". The skin-effect, described in the Moran and Kunz reference, supra, is a difference between the voltage actually induced in the receiver which is in phase with the transmitter current, and the voltage which could be induced in that same receiver if the correspondence between induced voltage and conductivity were linear. The relationship between the area enclosed by the peaks 43, 45 and the conductivity of the media surrounding the instrument can be used both to determine the conductivity of the media and to verify the determination of conductivity made by other methods known in the art, such as measurement of the magnitude of the voltage component which is in-phase with the transmitter current.

Figure 3:
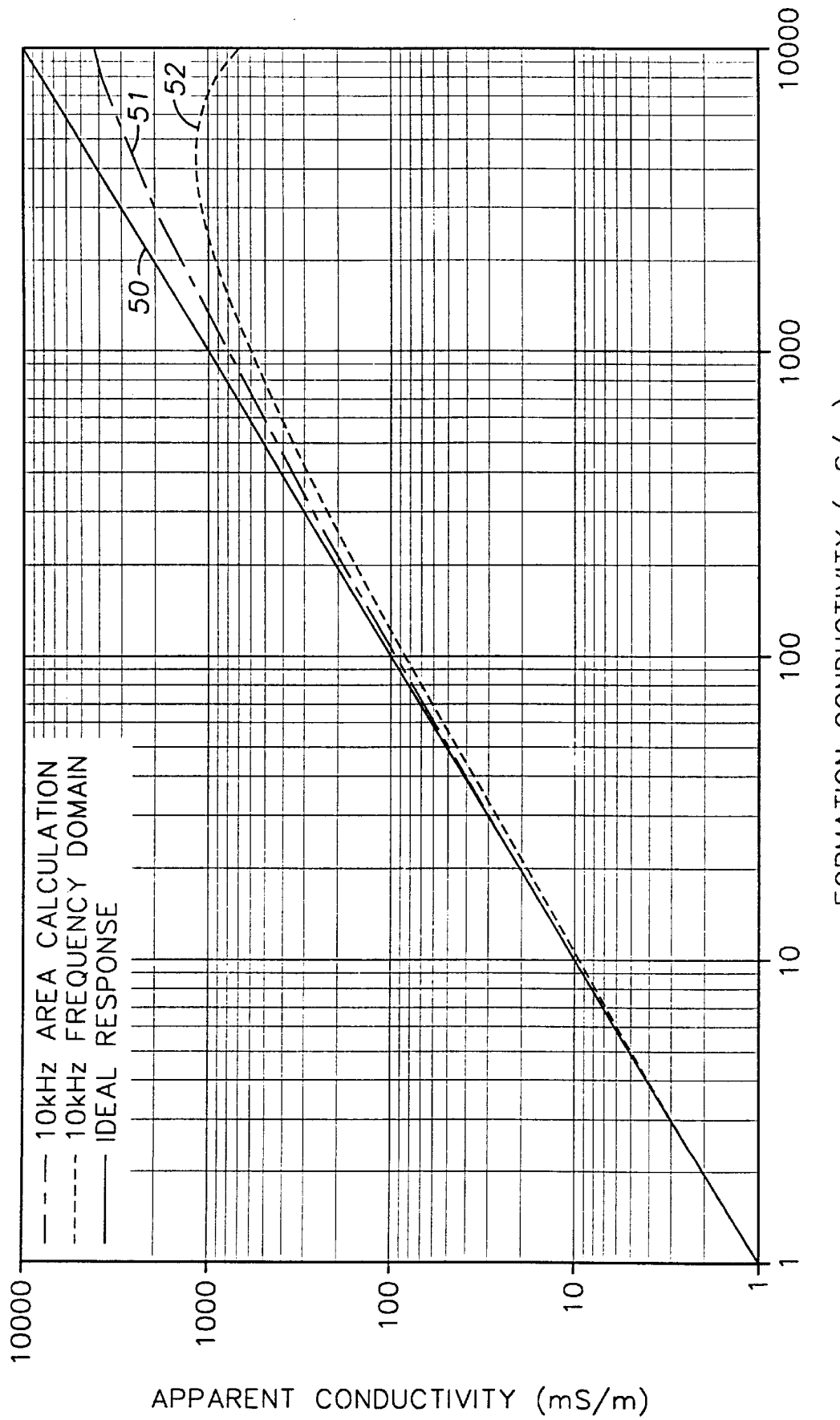
FIG. 3 shows a graph of correspondence between conductivity and area under one of the peaks in the receiver waveform of FIG. 2.

FIG. 3 shows a graph of the correspondence of the area under the peaks (43, 45 in FIG. 2) with respect to the conductivity of the media. The apparent conductivity as indicated by the area under the peaks is shown at curve 51. The actual conductivity of the medium is shown at curve 50. The conductivity, at a frequency of 10 KHz, indicated from measurement of the in-phase receiver voltage component is shown at curve 52.

The correspondence between the enclosed area of the peaks 43, 45 and the formation (media) conductivity is consistent with the theory of induction well logging. For example, from the Moran and Kunz reference, supra, the voltage which is induced, represented by V(ω), with respect to the media conductivity, σ, in a receiver as a function of the frequency of the transmitter current can be expressed as:

$$V(\omega) K\sigma[1 + O(\sqrt{\omega\mu\sigma})] \tag{1}$$

where K represents a constant of proportionality depending on (among other things) the spacing of the receiver from the transmitter, the frequency of and the magnitude of the transmitter current I(ω). μ represents magnetic permeability, and the "O" and subsequent square root terms represent the magnitude of the skin effect. K can be described by the following expression of proportionality:

$$K \propto \omega^2 I(\omega) \tag{2}$$

Since the transmitter voltage in the present invention is substantially a square wave, a subset (in time) of the transmitter voltage waveform can be represented as a step function:

$$v_T(t) = \begin{vmatrix} -v & \text{for} & t < 0 \\ v & \text{for} & t \geq 0 \end{vmatrix} \tag{3}$$

The Fourier transform of the expression in equation (3) can be written as:

$$V_T(\omega) = \frac{4jv}{\omega} \tag{4}$$

The transmitter (16 in FIG. 1) is typically an inductive load, and therefore an expression for the current flowing in the transmitter 16 with respect to the inductance L of the transmitter 16 can be written as:

$$I(\omega) = \frac{V_T(\omega)}{j\omega L} = \frac{4v}{\omega^2 L} \tag{5}$$

By substitution into equation (2), K can be described as:

$$K \propto \frac{v}{L} \tag{6}$$

The expression in equation (6) indicates that the constant of proportionality K is substantially independent of the frequency of the transmitter current if the transmitter voltage is substantially a square wave.

The area enclosed by one of the peaks 43, 45 can be described by the integral:

$$A = \int_{t_0}^{t_1} v(t)dt \tag{7}$$

The limits of the integral in equation (7), $t_0$ and $t_1$, can be selected to include substantially all of each peak (43, 45 in FIG. 2). If the frequency and the waveform of the transmitter current are appropriately selected, then substantially none of the area enclosed by the peaks 43, 45 will occur outside of a time interval between $t_0$ and $t_1$. The integration in equation (7) would then be equivalent to an integration from negative infinity to positive infinity:

$$A = \int_{-\infty}^{\infty} v(t)dt \tag{8}$$

The expression in equation (8) is readily recognizable as the zero frequency component of the Fourier transform (the spectrum) of v(t). This expression can be rewritten as:

$$A = V(\omega)|_{\omega=0} = K\sigma[1 + O(\sqrt{\omega\mu\sigma})]|_{\omega=0} \tag{9}$$

If ω=0, the skin effect terms O(ωμσ) reduce to zero, and the expression for the area enclosed by each peak 43, 45 reduces to:

$$A = K\sigma \tag{10}$$

indicating that the area enclosed by each peak is proportional to conductivity and is substantially independent of the skin effect.

The correspondence of the area under each peak 43, 45 to the conductivity becomes somewhat non-linear at very high conductivities. The peaks 43, 45 at very high conductivity become so spread out in time that some of the area enclosed by each peak can traverse the subsequent polarity change (41 in FIG. 2) of the transmitter voltage. This effect is most pronounced at very high conductivities, typically above about 1000 mS/m, and this effect can be observed by referring to FIG. 2 at curve 44. The non-linearity of correspondence between area under the peaks and conductivity is illustrated by comparison of curves 50 and 51 in FIG. 3. A correction can be readily devised for the non-linearity in order to be able to determine the true conductivity of the media from measurements of the area under each peak based on curve 51. While the area under the peaks at very high conductivity is somewhat non-linearly related to the conductivity of the media, it is important to recognize that the area under the peaks is still uniquely related to the conductivity. This stands in contrast to the measurement of the in phase voltage component as shown by curve 52 in FIG. 3, which becomes non-unique (by "fold-over") at conductivities in excess of about 5000 mS/m.

3. Determining Unbalanced Receiver Conditions

As is understood by those skilled in the art, the electromagnetic field radiated from the transmitter (16 in FIG. 1) as a result of passing the alternating current through it, results in some voltages being directly induced in the receivers (18A–18F in FIG. 1). Some induction logging instruments include second, "balancing" receivers, each located proximal to and series connected in inverse polarity to each corresponding receiver. The balancing receivers substantially remove the directly induced voltages from the receivers. Proper placement and tuning of the balancing receivers is important to their intended operation. Sometimes the balancing receivers can become out of adjustment, typically by axial movement, and thereby fail to remove the directly induced component of the voltage induced in the corresponding receiver. In the frequency domain, this unbalanced condition is typically observable only as a large magnitude quadrature component (90 degrees out of phase with the transmitter current) in the receiver voltage. In the present invention, however, the voltage induced in the receiver suffering the unbalanced condition will exhibit a square wave component superimposed on the waveform of the receiver voltage. The computer (26 in FIG. 1) can be programmed to detect square wave components present in the voltage of each receiver in order to notify the system operator that an unbalanced condition is present at that particular receiver. It is important to point out that the detection of the directly induced component in the receiver voltage is facilitated by using square waves to drive the transmitter 16. Sinusoidal current driving the transmitter, as in the prior art, would not directly induce a voltage in an unbalanced receiver which would be distinguishable by its waveform from the quadrature component of the receiver voltage.

Unbalanced receivers can also result from the presence of magnetic materials in the wellbore 2. *Using Induction Tools to Identify Magnetic Formations and to Determine Relative Magnetic Susceptibility and Dielectric Constant,* T. Barber and B. Anderson, Transactions of the 33rd Annual Logging Symposium, Jun. 14–17, 1992, Society of Professional Well Log Analysts, Houston, Tex. describes the effects of magnetic materials in the wellbore on the voltages induced in the receivers. As previously described, the prior art instruments typically exhibit large increases in the magnitude of the quadrature component of the receiver voltage in response to magnetic materials in the wellbore, but this response is not dispositive of the presence of magnetic materials in the wellbore 2. The present invention can be used to identify magnetic materials in the wellbore 2 by observation of unbalanced response (as previously described) at one receiver (such as 18F in FIG. 1) which soon disappears at that receiver 18F, and the unbalanced response reappears momentarily in the next axially proximal receiver (such as 18E–18A in FIG. 1) until the magnetic material has passed all the receivers. The same program resident in the computer (26 in FIG. 1) used to identify unbalanced conditions can be further modified to indicate relative movement of magnetic material by "tracking" the indication of unbalanced conditions at each receiver.

4. Determining Electrostatic Coupling of a Receiver to the Transmitter

As is understood by those skilled in the art, the receivers on the induction instrument are intended to have voltages induced in them as a result of very small magnetic fields generated by the eddy currents flowing in the earth formations. Inevitably there are electric fields present which could, if not properly shielded from the receivers, induce substantial voltages in the receivers. A common difficulty with induction logging instruments is failure, either partial or complete, of electrostatic shielding intended to reduce the effects of the electric fields on the receivers. Failure of electrostatic shielding in the present invention is readily observable as bipolar peaks, such as shown in FIG. 2 at 46, present in the receiver voltage substantially time coincident with a polarity change 41 of the transmitter current. The computer (26 in FIG. 1) can also be programmed to detect bipolar voltage excursions within a predetermined time window to cause indication to the system operator of electrostatic shielding problems at the affected receiver.

It is to be expressly understood that the processing methods for induction receiver signals described herein need not be limited to performance while the instrument (10 in FIG. 1) is disposed in the wellbore (2 in FIG. 1). It is known in the art to record signals in a recording device disposed within the downhole instrument and to perform signal processing after the downhole instrument is retrieved from the wellbore and the recording device is accessed. See for example U.S. Pat. No. 4,216,536 issued to More. As long as the receiver (18A–18F in FIG. 1) signals are provided in a time domain form, the methods of the present invention can be performed at any time after the acqusition of the signals.

Those skilled in the art will readily devise other embodiments of the invention described herein which do not depart from the spirit of the invention. Therefore the invention should be limited in scope only by the attached claims.

What is claimed is:

1. A method of determining conductivity of earth formations penetrated by a wellbore, comprising:

inserting an induction well logging instrument into said wellbore, said instrument including a transmitter a source of alternating current connected to said transmitter and a receiver;

energizing said transmitter with said alternating current;

recording voltages induced in said receiver; and determining area enclosed with respect to a baseline by voltage peaks within said detected voltages, said area corresponding to said conductivity.

2. The method as defined in claim 1 wherein said alternating current comprises square waves.

3. The method as defined in claim 1 wherein said instrument comprises a plurality of receivers at axially spaced apart locations and said steps of recording and determining said area are performed for each of said plurality of receivers.

4. A method of determining conductivity of earth formations penetrated by a wellbore by analyzing voltages induced in a receiver of an induction well logging instrument inserted into said wellbore, said voltages induced as a result of energizing a transmitter on said instrument with alternating current, the method comprising:

determining area enclosed with respect to a zero voltage baseline by voltage peaks within said detected voltages, said area corresponding to said conductivity.

5. The method as defined in claim 4 wherein said alternating current comprises square waves.

6. The method as defined in claim 4 wherein said instrument comprises a plurality of receivers at axially spaced apart locations and said steps of recording and determining said area are performed for each of said plurality of receivers.

* * * * *